(Model.)
J. MOORE.
SEAT FOR VEHICLES.
No. 268,519. Patented Dec. 5, 1882.
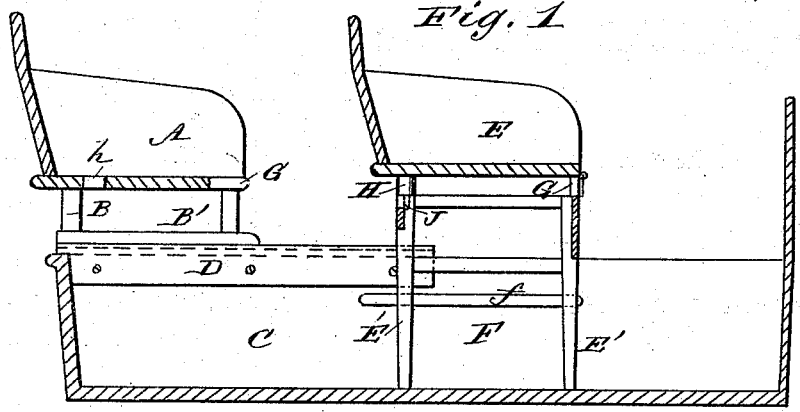
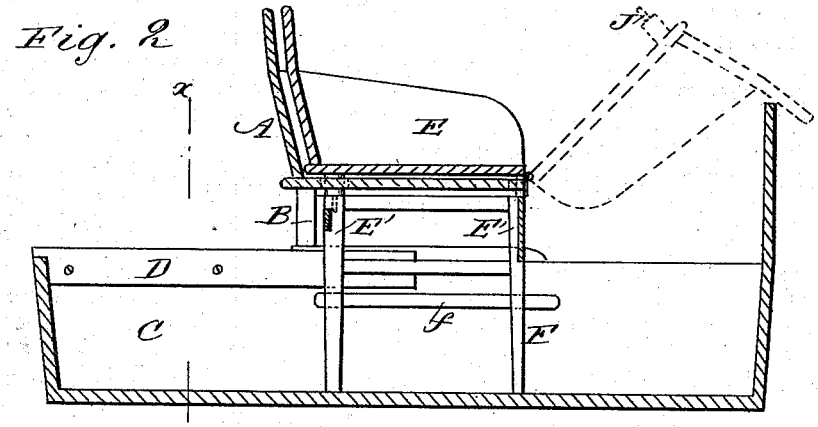
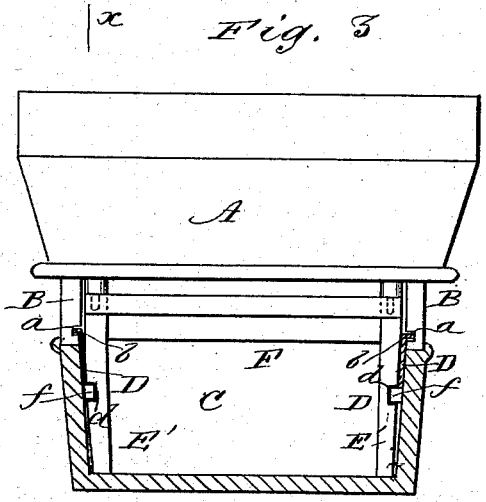
WITNESSES:
INVENTOR:
J. Moore
BY Munn & Co.
ATTORNEYS.

UNITED STATES PATENT OFFICE.

JOHN MOORE, OF AMHERST, NOVA SCOTIA, CANADA.

SEAT FOR VEHICLES.

SPECIFICATION forming part of Letters Patent No. 268,519, dated December 5, 1882.

Application filed July 15, 1882. (Model.) Patented in Canada April 8, 1882, No. 14,560.

*To all whom it may concern:*

Be it known that I, JOHN MOORE, of Amherst, Nova Scotia, Canada, have invented a new and useful Improvement in Seats for Vehicles, of which the following is a full, clear, and exact description.

The object of my improvement is to provide new and improved seats for vehicles, which can be so adjusted that when folded they only occupy the space of the front seat.

Reference is to be had to the accompanying drawings, forming part of this specification, in which similar letters of reference indicate corresponding parts in the several figures.

Figure 1 is a longitudinal sectional elevation of a vehicle provided with my improved seats, showing them separated. Fig. 2 is a longitudinal elevation of the same, showing the rear seat passed under the front seat; and Fig. 3 is a cross-sectional elevation of the same on the line $x\ x$, Fig. 2.

The rear seat, A, is provided with end supports, B, attached to a base-plate, B', resting on and adapted to slide on the upper edges of the side boards of the box C, which base-pieces B' are provided on the inner sides and near the bottom with longitudinal grooves $a$, into which the flanges $b$ at the upper edges of track-plates D pass, which are attached to the inner surfaces of the side boards of the box, which flanged tracks hold the seat on the box and permit the seat to slide on the upper edges of these side boards. The front seat, E, is supported by a leg-frame, F, the legs E' of which rest on the bottom of the box C. The legs are provided in the outer sides with notches $d$, into which the track-ridges $f$, attached to the inner surfaces of the side boards of the wagon, pass, which ridges hold the seat on the box and permit the seat to slide in the direction of the length of the box. The seat E is hinged at its front corners to blocks G, secured on the front edge of the top of the leg-frame F, and the seat is provided at the rear corners and on its under sides with blocks H, from the lower ends of which pins J project. The rear seat, A, is provided at its front corners with recesses $g$, and at the rear corners with recesses or apertures $h$.

The operation is as follows: If two seats are to be used, they are in the position shown in Fig. 1, and can be adjusted a greater or less distance from the front and rear ends of the wagon-box. If the seats are combined in one, the front seat, E, is swung upward and forward, as shown in dotted lines in Fig. 2, and the rear seat, A, is pushed forward until it is above the leg-frame F of the front seat. The front seat, E, is then swung back over the rear seat, the blocks H passing through the recesses or apertures $h$ on the rear corners of the seat A, and thus locking the two seats together, the pins J passing into the upper ends of the rear legs, E. The two seats will thus occupy the space of one seat only, and can easily be separated if two seats are required.

These seats can be used on sleighs as well as on vehicles.

Having thus described my invention, I claim as new and desire to secure by Letters Patent—

1. The combination, with the sliding rear seat, A, having the apertures $g\ h$, of the front hinged seat, E, blocks G H, and the pins J, adapted to pass into the upper ends of the legs E', as shown and described.

2. The combination, with a vehicle-box, C, of the rear seat, A, provided with grooves $a$ in the inner surfaces of its supports, the flanged track-plates D, the hinged front seat, E, under which the rear seat is adapted to pass, the legs E', provided with notches or recesses $d$ in the outer sides, and of the guide-ridges $f$ in the inner surfaces of the sides of the box, substantially as herein shown and described, and for the purpose set forth.

JOHN MOORE.

Witnesses:
W. INGLIS MOFFUT,
R. C. FULLER.